Sept. 12, 1967 — A. J. CARDILLO — 3,341,078
DISPENSING APPARATUS
Filed Jan. 11, 1966 — 2 Sheets-Sheet 1
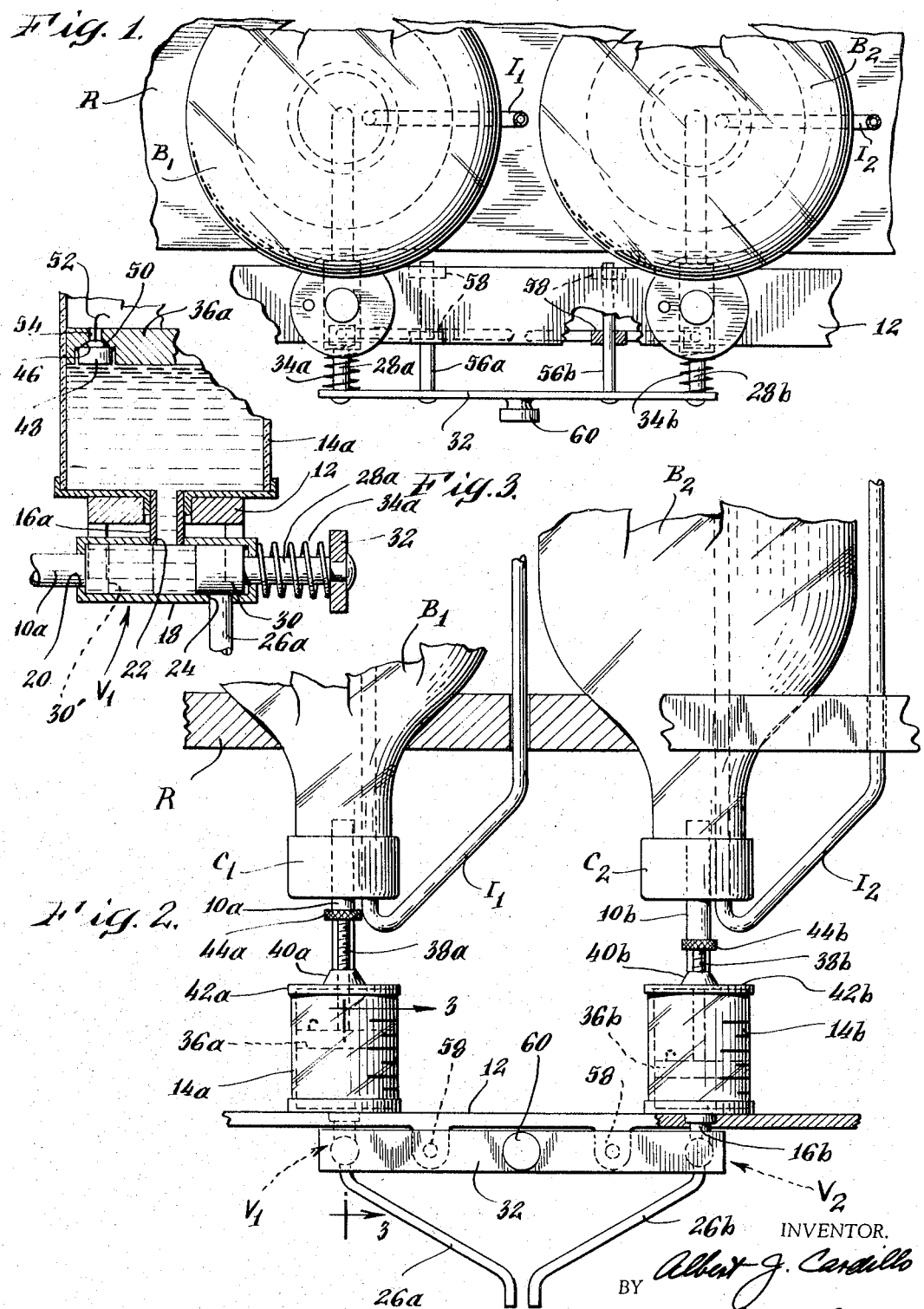

3,341,078
DISPENSING APPARATUS
Albert J. Cardillo, 104 West St., Danbury, Conn. 06810
Filed Jan. 11, 1966, Ser. No. 519,899
8 Claims. (Cl. 222—129.4)

This invention relates to a dispensing apparatus and, more particularly, to such an apparatus for simultaneously dispensing measured amounts of a plurality of liquids.

A professional bartender is often called upon to mix the same drink many times in one day. This is particularly true of the more popular cocktails, such as the martini and the manhattan. The mixing of these drinks is time consuming and, because of the time factor, most bartenders learn to gage the amount of the various ingredients by eye. This, of course, requires skill which is gained only by practice. Furthermore, it may result in waste and the drinks themselves may vary considerably from one to the other. Accordingly, it is a primary object of the present invention to provide an improved dispensing apparatus which is particularly useful for dispensing alcoholic beverages. Another object is to provide such an apparatus wherein the amounts dispensed are easily adjustable to any preselected ratio. Another object is to provide such an apparatus which is simple and rapid to operate. Another object is to provide such an apparatus which is adapted to dispense any of a plurality of cocktail-making liquid ingredients. Other objects, features, and advantages will be apparent from the following description, the appended claims, and the figures of the attached drawings wherein:

FIG. 1 is a top view of an apparatus constructed in accordance with this invention, portions thereof being broken away to illustrate its construction;

FIG. 2 is a front view of the apparatus of FIG. 1;

FIG. 3 is an enlarged cross-section taken substantially along the line 3—3 of FIG. 2.

Figure 4:
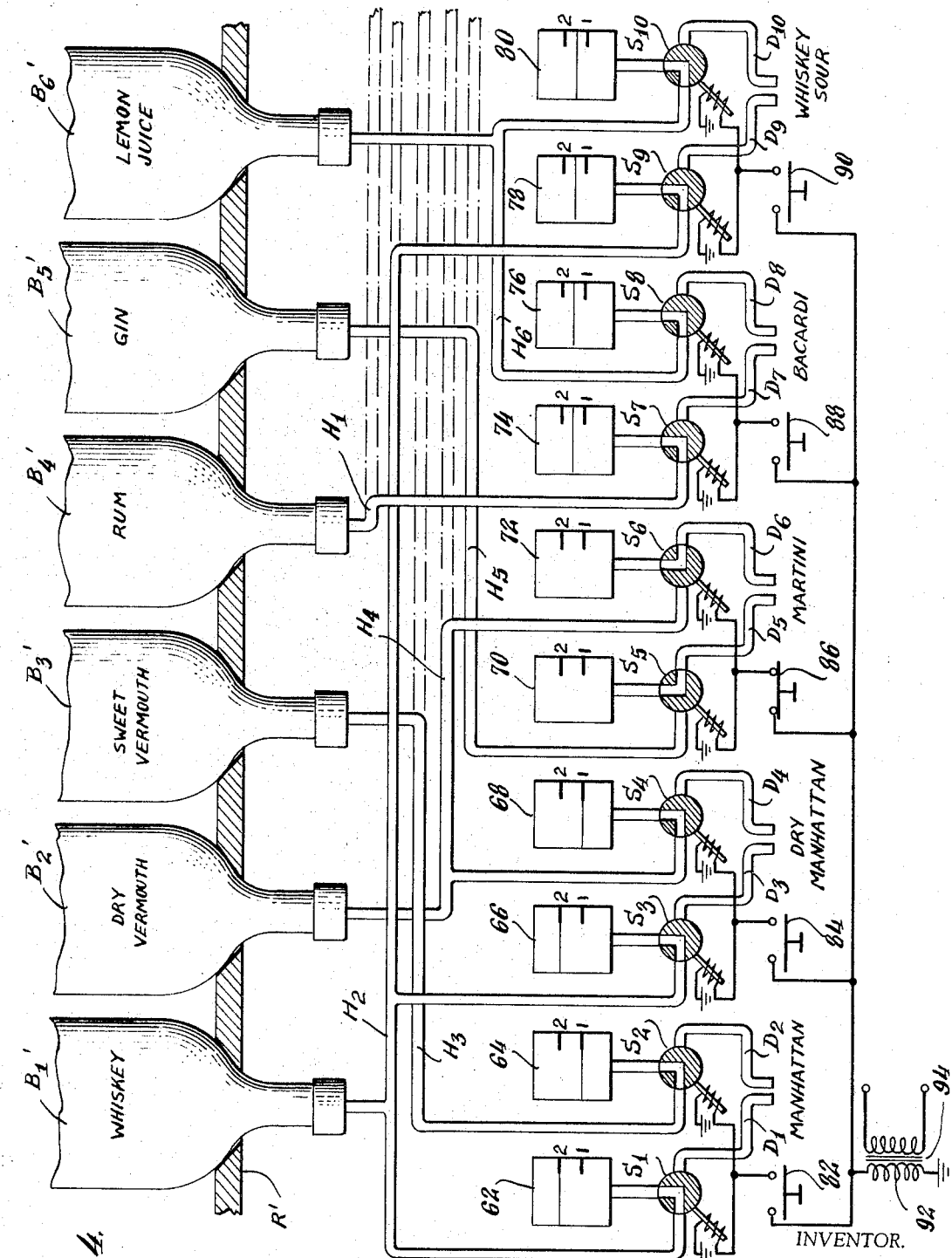
FIG. 4 illustrates a modification of the invention for dispensing the ingredients for a plurality of cocktails.

The objects of this invention are achieved by providing apparatus for simultaneously dispensing measured amounts of at least two liquids. The apparatus includes storage means for each of the liquids, and a measuring chamber for each liquid. First conduit means interconnect each of the chambers with one of the storage means so that each of the chambers is normally filled with its corresponding liquid. Second conduit means are connected to discharge each of said chambers. Selector valve means are associated with each chamber having a first position which normally connects the chamber to a first conduit means and a second position which connects the chamber to a second, discharge, conduit means. Means are provided for simultaneously actuating at least two of the selector valve means from their first to their second positions.

For purposes of illustration, the invention will first be described as applied to a dispensing apparatus for dispensing a single cocktail—in this instance, a martini. Referring to FIGS. 1–3 a rack R is provided for supporting bottles $B_1$, $B_2$, or other suitable containers, in an inverted position. In the described embodiment, bottles $B_1$, $B_2$ would contain gin and dry vermouth respectively. The necks of the bottles $B_1$, $B_2$ are closed by caps $C_1$, $C_2$, respectively, through each of which extend two tubes. The tubes $I_1$, $I_2$ are air inlet tubes. One end of each tube is within the respective bottle while the other end is outside the bottle. It will be understood that both ends extend to a height which would be above the normal liquid level within the inverted bottles when the bottles are substantially filled. Extending downwardly from each of the caps $C_1$, $C_2$ is a conduit $10a$ from cap $C_1$ and $10b$ from Cap $C_2$. The upper ends of these conduits are positioned near the bottom of the inverted bottle so as to drain the liquid from each bottle into its corresponding valve and measuring chamber as will now be described.

Positioned below the bottles is a shelf member 12. Mounted upon this shelf member are a plurality of transparent, graduated, cylindrical measuring chambers $14a$, $14b$. Each of the measuring chambers is joined by means of a short tube $16a$, $16b$ respectively to a corresponding valve $V_1$, $V_2$. The valves are identical and their construction may be best understood by reference to FIG. 3. In this figure valve $V_1$ will be seen to comprise a cylindrical valve body 18 which is ported at three locations. An inlet port 20 connects the rearward end of the valve body 18 with the conduit $10a$ from bottle $B_2$. An intermediate port 22 interconnects the valve body 18 with the tube $16a$ from measuring chamber $14a$. A discharge port 24 is formed in the lower side wall of the valve body near its forward end and is connected to a discharge conduit $26a$. The valve is operated by means of a valve stem $28a$ which extends through the front wall of the valve body 18. A cylindrical valve plunger 30 is mounted on the inner end of valve stem $28a$ and is slidable within the valve body 18. The outer end of the valve stem is secured to an actuating bar 32. A coil spring $34a$ mounted between the valve body 18 and the actuating bar 32 tends to maintain the valve plunger in the position illustrated in FIG. 3. In this position it will be noted that the discharge port 24 and discharge conduit $26a$ are sealed off from ports 20 and 22 so that no liquid will flow from the valve. It will also be noted that the ports 20, 22 remain open so that liquid will normally tend to flow into the valve body 18 from conduit $10a$ and into the measuring chamber $14a$ through tube $16a$. The liquid volume within each of the measuring chambers $14a$, $14b$ is controlled by means of a piston $36a$, $36b$ which makes a liquid seal with the transparent side walls of its corresponding measuring chamber $14a$, $14b$. The piston in turn is mounted on the end of a screw $38a$, $38b$ which extends through an internally threaded boss $40a$, $40b$ provided on a cap $42a$, $42b$ which closes the top of each measuring chamber. The upper end of each of the screws $38a$, $83b$ is provided with a knurled knob $44a$, $44b$ for turning the screw and thereby adjusting the height of the piston within the measuring chamber. The sides of measuring chambers $14a$, $14b$ are provided with graduations for indicating the volume enclosed below the corresponding piston. These graduations are in ounces and half-ounces to a total volume in each chamber of approximately three ounces. Each of the pistons is provided with a suitable air vent for allowing liquid to flow rapidly into and out of the chamber. In FIG. 3 such a vent is indicated as a recess in piston $36a$ defining a conical valve seat 46. A float 48 is positioned within the recess and includes a conical surface 50 which mates with the valve seat 46 to close the vent. A small hooked wire 52 extends through a guideway 54 in the piston. When the measuring chamber is filled with liquid, as shown in FIG. 3, the float 48 will be seen to close off the air vent so as to prevent liquid escaping through the piston $36a$ and out of the measuring chamber.

It will now be apparent from FIG. 3 that when valve $V_1$ is in the position illustrated, the measuring chamber $14a$ will be filled with liquid in an amount determined by the height of piston $36a$. Upon depression of the valve stem $28a$, the plunger 30 will move to the position $30'$. In this position, liquid flow from conduit $10a$ into the valve body 18 will be blocked, but the liquid entrapped within the measuring chamber $14a$ will flow out of the tube $16a$, through the valve body 18, and out the discharge conduit $26a$. While this discharge is taking place, the receding surface of liquid within the chamber will permit the float 48 to drop and permit air to enter the chamber. Upon releasing valve stem 28a, the plunger 30 will return to the illustrated position and liquid will once more flow into the measuring chamber 14a. Entrapped air will pass out the open vent which will close as the liquid level raises the float 48 into position. It will thus be seen that actuation of the valve $V_1$ will, in each instance, release a measured quantity of liquid.

In order to dispense two of the components needed for a cocktail, the actuating bar 32 extends from valve $V_1$ to valve $V_2$, the valve stems 28a, 28b being connected to opposite ends of the bar. Forward and backward movement of the actuating bar is permitted by means of guide pins 56a, 56b which slidably extend through openings provided in brackets 58 depending from the shelf member 12. A button 60 is centrally positioned on the actuating bar. It will thus be seen that depression of button 60 will open both of valves $V_1$ and $V_2$ and permit the contents of measuring chambers 14a, 14b to be simultaneously dispensed through the discharge conduits 26a, 26b. It will also be noted that the volume of the components dispensed will be in accordance with the prior settings of pistons 36a, 36b. In the disclosed embodiment, for example, if bottle $B_1$ contains gin and bottle $B_2$ dry vermouth, and if the pistons 36a, 36b are set for a ratio of two to one, as shown in FIG. 2, the liquid components for a martini will be dispensed through the discharge conduits. It is contemplated that these components will be discharged either into an ice-filled shaker or, alternatively, directly into a glass containing ice.

In FIG. 4 there is illustrated a variation of this invention wherein its versatility is more fully apparent. To simplify the showing, FIG. 4 is basically in schematic form. In FIG. 4 the rack R' is shown as supporting a plurality of bottles $B_1'$–$B_6'$, each of which contains an ingredient required in formulating a popular mixed drink. That all the ingredients need not be alcoholic is evidenced by the fact that bottle $B_6'$ contains lemon juice. Sources of supply for sugar syrups and other alcoholic or non-alcoholic ingredients could also be provided. Each of the bottles is connected to supply its contents to a header $H_1$–$H_6$. Positioned below the level of the bottles are a plurality of measuring chambers 62, 64, 66, 68, 70, 72, 74, 76, 78, 80. Each of these measuring chambers is constructed in a manner similar to chambers 14a, 14b previously described. Each of the measuring chambers is connected by means of a tube to one port of a corresponding solenoid operated three-way valve $S_1$–$S_{10}$. One of the remaining two ports of each solenoid valve is connected to one of the headers and the other is connected to one of the discharge lines $D_1$–$D_{10}$. The coils of each pair of adjacent solenoid valves are connected in parallel with one another and in series with one of push button switches 82, 84, 86, 88, 90. These parallel combinations are, in turn, connected in parallel with one another and are in series with a suitable power supply such as the secondary winding 92 of a transformer 94.

In order to dispense the ingredients for a desired drink, it is merely necessary to depress one of the push buttons and thereby actuate its associated valves. For example, in the illustration, push button 86 is shown depressed and solenoid valves $S_5$ and $S_6$ are thereby rotated to dispense the liquids contained in measuring chambers 70, 72 through their discharge lines $D_5$, $D_6$. The solenoid valves may be spring-loaded in order that they may return to their original positions when the push button is released.

It is believed that the many advantages of this invention will now be apparent to those skilled in the art. It will also be apparent that a number of variations and modifications may be made in the invention without departing from its spirit and scope. Accordingly, the foregoing description is to be construed as illustrative only, rather than limiting. This invention is limited only by the scope of the following claims.

What I claim as new and desire to secure by Letters Patent of the United States is:

1. A mixed drink dispenser which comprises: rack means for supporting therein a plurality of beverage-containing bottles in an inverted position; closure means in the mouth of each bottle; vent tube means extending through each closure means to supply atmospheric air to the interior of the associated bottle; a measuring chamber associated with each of said bottles and having a selectively variable volume; a plurality of first conduit means, each extending through one of said closure means and in fluid flow relationship with different ones of said measuring chambers whereby each of said chambers is normally filled from an associated bottle; a plurality of second conduit means, each connected to discharge a separate one of said chambers; a plurality of selector valve means, one associated with each of said chambers and having a first position normally connecting said chamber to its associated first conduit means and actuatable to a second position connecting said chamber to its associated second conduit means; and single means for substantially simultaneously actuating any selected two of said selector valve means from their first to their second positions to simultaneously discharge the contents of the associated chambers.

2. The apparatus of claim 1 wherein the wall of each of said measuring chambers is transparent and graduated.

3. The apparatus of claim 2 wherein each of said measuring chambers is substantially cylindrical and includes a vertically movable piston forming a top wall therein.

4. The apparatus of claim 3 wherein the top of said measuring chamber is closed by a cap and said piston includes an adjusting screw secured to said piston and extending through a threaded opening in said cap.

5. The apparatus of claim 1 wherein each of said selector valve means is manually actuated.

6. The apparatus of claim 1 wherein each of said selector valve means is a solenoid valve.

7. The apparatus of claim 6 wherein said actuating means comprises a power source and a switch in series with said power source and at least two of said solenoid valves.

8. The apparatus of claim 1 wherein each of said measuring chambers includes air vent means permitting the flow of air into and out of said chamber but preventing the flow of liquid therefrom.

References Cited
UNITED STATES PATENTS

| | | | |
|---|---|---|---|
| 598,035 | 1/1898 | Towle | 222—440 X |
| 868,023 | 10/1907 | Simpson | 222—444 X |
| 1,543,715 | 6/1925 | McCue | 222—438 X |
| 2,218,773 | 10/1940 | Sparling | 222—440 X |
| 2,578,215 | 12/1951 | Wilson | 222—440 |
| 2,746,646 | 5/1956 | Hall | 222—181 X |

ROBERT B. REEVES, *Primary Examiner.*

N. L. STACK, *Assistant Examiner.*